United States Patent
Tzidon et al.

[11] Patent Number: 5,756,354
[45] Date of Patent: May 26, 1998

[54] ANIMATING THREE DIMENSIONAL IMAGES BY SELECTIVELY PROCESSING INTERMEDIATE ANIMATION FRAMES

[75] Inventors: Aviv Tzidon, Azour; Menachem Polak, Tel Mond, both of Israel

[73] Assignee: B.V.R. Technologies Ltd., Givatayim, Israel

[21] Appl. No.: 782,510

[22] Filed: Jan. 9, 1997

Related U.S. Application Data

[63] Continuation of Ser. No. 607,147, Feb. 26, 1996, abandoned, which is a continuation of Ser. No. 79,989, Jun. 18, 1993, abandoned.

[30] Foreign Application Priority Data

Jun. 24, 1992 [IL] Israel .......................... 102289

[51] Int. Cl.$^6$ .................................... G06T 15/70
[52] U.S. Cl. .................................... 345/424
[58] Field of Search .................... 395/121–124, 395/502, 506, 512; 435/421–424

[56] References Cited

U.S. PATENT DOCUMENTS

| | | | |
|---|---|---|---|
| 4,888,583 | 12/1989 | Ligocki et al. | 345/420 |
| 4,951,039 | 8/1990 | Schwendeman et al. | 345/473 |
| 4,985,834 | 1/1991 | Cline et al. | 345/424 |
| 4,985,856 | 1/1991 | Kaufman et al. | 345/424 |
| 5,025,375 | 6/1991 | Sugawara | 345/424 |
| 5,046,026 | 9/1991 | Tolomei | 345/473 |
| 5,095,521 | 3/1992 | Trousset et al. | 345/421 |
| 5,101,475 | 3/1992 | Kaufman et al. | 345/424 |
| 5,201,035 | 4/1993 | Stytz et al. | 345/502 |
| 5,252,953 | 10/1993 | Sandrew et al. | 345/473 |
| 5,261,041 | 11/1993 | Susman | 345/473 |
| 5,313,566 | 5/1994 | Hedley et al. | 345/419 |
| 5,313,567 | 5/1994 | Civanlar | 345/424 |
| 5,315,512 | 5/1994 | Roth | 600/442 |
| 5,339,386 | 8/1994 | Sodenberg et al. | 345/422 |
| 5,353,392 | 10/1994 | Luquet et al. | 345/435 |
| 5,359,703 | 10/1994 | Robertson et al. | 345/419 |
| 5,361,385 | 11/1994 | Bakalash | 345/424 |
| 5,392,392 | 2/1995 | Fisher et al. | 345/523 |
| 5,412,763 | 5/1995 | Knoplioch et al. | 345/424 |
| 5,425,139 | 6/1995 | Williams et al. | 345/474 |
| 5,442,733 | 8/1995 | Kaufman et al. | 345/424 |

*Primary Examiner*—Anton Fetting
*Attorney, Agent, or Firm*—Schwegman, Lundberg, Woessner & Kluth, P.A.

[57] ABSTRACT

A method and system for animating a 3-dimensional graphics model composed of geometrical elements which is viewed by an observer whose line of sight effects relative movement with respect to the model. Successive frames of pixels are processed by obtaining motion parameters corresponding to the relative movement of the observer's line of sight with respect to the model and processing all of the geometrical elements in the 3-dimensional graphics model in order to derive a large number of voxels some of which are hidden from the observer's line of sight and are therefore superfluous. The superfluous voxels are eliminated from the large number of voxels so as to derive successive intermediate frames each containing a relatively small number of voxels within the observer's line of sight, and each intermediate frame is processed at a rate no less than the frequency of fusion so as to produce and display successive intermittent frames of pixels wherein relative movement appears continuous to the observer.

7 Claims, 2 Drawing Sheets

ANIMATING THREE DIMENSIONAL IMAGES BY SELECTIVELY PROCESSING INTERMEDIATE ANIMATION FRAMES

This is a continuation of application Ser. No. 08/607,147, filed Feb. 26, 1996, abandoned, which is a continuation of application Ser. No. 05/07,989, filed Jun. 18, 1993, abandoned.

FIELD OF THE INVENTION

This invention relates to a method and system for animation processing of a 3-dimensional graphics model.

BACKGROUND OF THE INVENTION

The animation picture industry was founded on the realization that animation or apparent movement could be achieved by successively presenting to the human eye still images at high frequency, each representing a small, incremental movement with respect to its predecessor. Providing the frequency at which the still images are presented to the human eye exceeds the so-called "frequency of fusion", the eye is unable to detect that it is, in reality, seeing only discrete images and the eye-brain combination labors under the illusion that it is seeing a continuous, moving picture.

Modern graphics systems which exploit this fact abound and what all such systems have in common is the capture of successive frames of digital information which are then displayed on a suitable display screen at sufficiently high frequency. When it is desired to display such images at high resolution, then, of course, the display monitor itself must possess a large number of pixels and this in turn demands that each displayed frame of digital image data requires a large volume of data. In practice, this means not only that large memories are required for storing the digital image data but, more importantly, that very fast processing is required in order to be able to process each frame of image data presented to the display monitor at a rate no less than the frequency of fusion, i.e. about 30 Hz.

In practice, a moving picture is derived by generating a large number of frames of pixel data each representing slight incremental movements between one frame and its successor. Such movements manifest themselves by the change in pixel data between adjacent frames and may be due either to the fact that elements appear in adjacent frames viewed from slightly different perspectives or, alternatively, that, owing to a shift in perspective, elements appearing in one frame are absent from the next frame, or vice versa.

Conventional animation graphics techniques draw no distinction between these two different effects in a change of perspective. Thus, it is normal to process the whole graphics model in order to generate successive frames of pixel data both in order to determine those pixels which appear differently in successive frames and those which either appear or vanish between successive frames. Such processing requires as its input a geometrical model built from graphics primitives which may either be polygon data or voxels respectively representative of the hidden and seen surfaces or volume elements in the 3-dimensional model.

As is known in the art, in order to determine which surfaces or voxels are visible in the model from a particular perspective, the model is processed in order to remove those surfaces or voxels which are "hidden" and therefore not visible. In prior art methods and systems, such processing must therefore be effected in respect of the complete 3-dimensional model.

In fact, this is an inefficient use of resources. Specifically, it is certainly necessary to process a particular frame of interest at a sufficiently high frequency in order to give the impression of continuous movement between adjacent discrete frames. This is a natural consequence of the theory of persistence of vision as explained above. However, it is by no means necessary to process hidden data at the same high frequency simply on the basis that during the small time interval between capturing successive frames, what was previously hidden data might appear within the frame of interest.

This notwithstanding, no distinction is made in the prior art between those pixels which appear in adjacent frames albeit seen from a slightly different perspective and those which appear in one frame but not in an adjacent frame. As a result voluminous processing is required between successive frames of pixel data in order to provide the impression of continuous motion both with regard to those pixels which appear in both frames and those which appear in one frame but not the other.

SUMMARY OF THE INVENTION

It is an object of the invention to provide a method and system for animation processing of a 3-dimensional graphics model in which the above drawbacks are eliminated.

According to a first aspect of the invention there is provided in a process for animating a 3-dimensional graphics model composed of geometrical elements which is viewed by an observer whose line of sight effects relative movement with respect to the model, a method for processing successive frames of pixels, comprising the steps of:

(1) obtaining motion parameters corresponding to the relative movement of the observer's line of sight with respect to the model, (2) processing all of the geometrical elements in the 3-dimensional graphics model in order to derive a large number of voxels some of which are hidden from the observer's line of sight and are therefore superfluous, (3) eliminating the superfluous voxels from the large number of voxels so as to derive successive intermediate frames each containing a relatively small number of voxels within the observer's line of sight, (4) successively processing each intermediate frame at a rate no less than the frequency of fusion so as to produce successive intermittent frames of pixels wherein relative movement appears continuous to the observer, and (5) displaying each of said intermittent frames of pixels.

A system in accordance with the invention for animation processing a 3-dimensional graphics model composed of geometrical elements which is viewed by an observer whose line of sight effects relative movement with respect to the model, comprises:

storage means for storing the 3-dimensional graphics model, movement determination means for determining relative movement of the observer's line of sight with respect to the model, geometrical processing means coupled to the storage means and to the movement determination means and responsive to the relative movement of the observer's line of sight with respect to the model for processing the 3-dimensional graphics model in order to derive a large number of voxels some of which are hidden from the observer's line of sight and are therefore superfluous, voxel processing means coupled to the geometrical processing means and to the movement determination means and responsive to the relative movement of the observer's line of sight with respect to the model for eliminating the superfluous voxels from the large number of voxels so as to derive successive intermediate frames each containing a relatively small number of voxels within the observer's line of sight, frame processing means coupled to the voxel processing means for successively processing each intermediate frame at a rate no less than the frequency of fusion so as to produce successive intermittent frames of pixels, and display means coupled to the intermittent frame processing means for displaying the successive intermittent frames of pixels.

In general, successive intermediate frames of voxels are derived at a variable frequency which depends principally on the complexity of the geometrical model and on the total number of voxels which are produced therefrom. This in turn affects the number of voxels which either appear or vanish between successive intermediate frames. The processing rate also depends on other factors such as, for example, the available processing power and so on. In contrast to this, the rate at which each successive intermediate frame is processed in order to produce successive intermittent frames of pixels is generally fixed at a value which exceeds the frequency of fusion. Thus, each intermediate frame is produced at relatively low frequency but the effect of continuous movement is nevertheless achieved by generating successive intermittent frames at a sufficiently high frequency.

The invention thus capitalizes on the fact that only those movements of pixels actually within the intermediate frame need be processed at the frequency of fusion whereas movements of pixels outside of the intermediate frame, but which might possibly enter the intermediate frame between one frame and the next, can be processed at a lower frequency: the only actual consequence being a slight delay in which such movement would be apparent to the observer.

BRIEF DESCRIPTION OF THE DRAWINGS

In order to understand the invention and to see how the same may be carried out in practice, a preferred embodiment will now be described, by way of non-limiting example only, with reference to the accompanying drawings, in which.

DETAILED DESCRIPTION OF A PREFERRED EMBODIMENT

Figure 1:
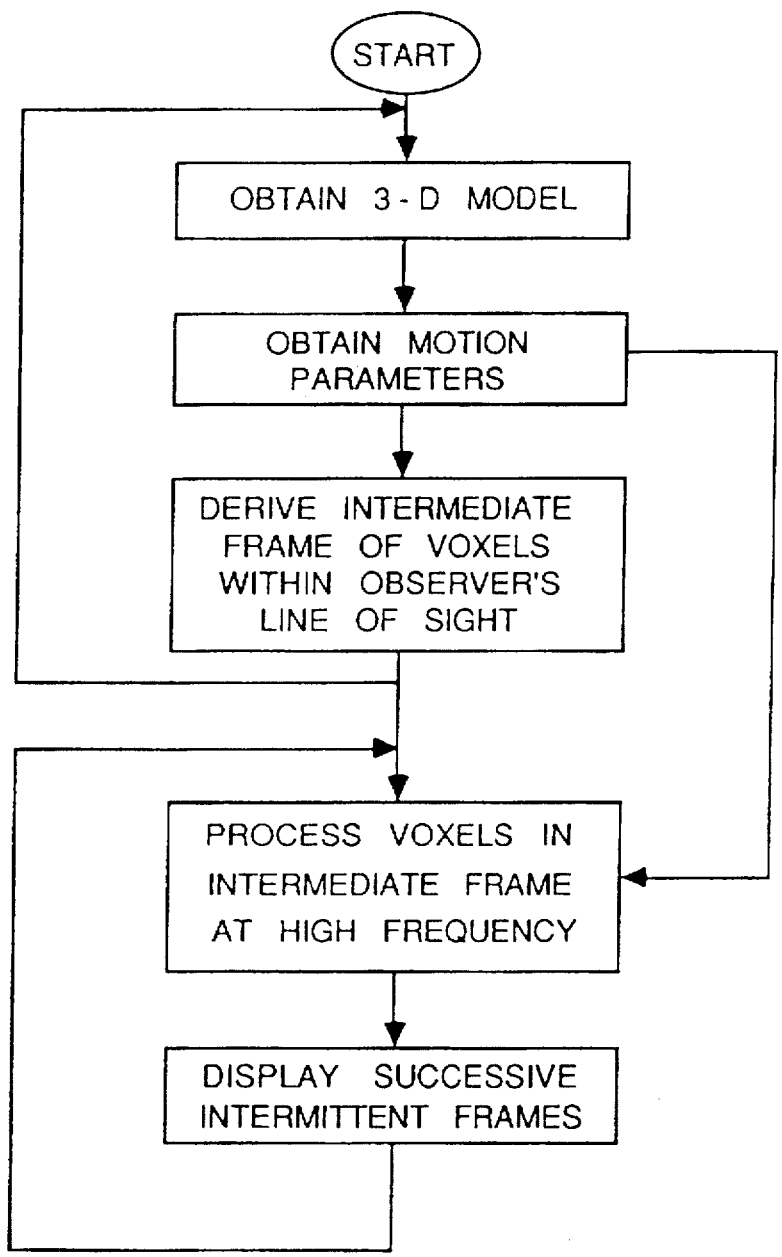
FIG. 1 is a flow diagram showing a method according to the invention.

FIG. 1 is a flow diagram of a method according to the invention for animation processing a 3-dimensional graphics model. The method comprises two logical loops: one relating to the processing of the 3-dimensional model itself in order to derive successive intermediate frames within an observer's line of sight; and the other to the processing of each intermediate frame so as to produce the effect of animation. Each intermediate frame is processed at a constant rate of approximately 30 Hz, corresponding to the frequency of fusion, in order that what are in reality discrete movements of the pixels in successive intermittent frames appear continuous to the observer. On the other hand, the 3-dimensional model itself is processed at a lower frequency which is not constant and is dependent inter alia on the complexity of the 3-dimensional model and the total number of voxels which are produced therefrom.

The motion parameters correspond to the movement of the observer's line of sight with respect to the model. Determination of the motion parameters permits the 3-dimensional model to be manipulated in order to derive an intermediate frame containing only a relatively small number of voxels in the 3-dimensional model equal to the number of pixels in the display device. Thus, in the first loop, all of the geometrical elements in the 3-dimensional graphics model are processed in order to derive a large number of voxels some of which are within the observer's line of sight but most of which typically are hidden. The hidden voxels are not visible to the observer and are therefore superfluous.

The above process is continued repeatedly in order to derive successive intermediate frames each of which contains only those voxels, at the instant of processing, within the observer's line of sight. The actual algorithms employed for deriving the intermediate picture from the 3-dimensional model are known in the art and therefore are not themselves a feature of the invention. Typically, the algorithm manipulates a model comprising polygon and textural information in accordance with the motion parameters so as to perform the required 3-dimensional transformation relating to changes in perspective and hidden surface removal so as thereby to derive only those voxels within the observer's line of sight.

The relatively small number of voxels in each intermediate frame thus produced is now processed at high frequency (at least 30 Hz) in accordance with the motion parameters in order thereby to derive successive intermittent frames wherein the actual discrete movement therebetween appears continuous to the observer.

In practice, the two loops shown in FIG. 1 are performed independently of one another, the second loop being repeated in respect of the most current intermediate frame derived in the first loop, this being replaced as each new intermediate frame is derived. Thus, if the time interval between two successive intermediate frames is 0.2 s, then during this time interval six intermittent frames would be generated from the current intermediate frame at a processing frequency of 30 Hz. By this means, the overall processing frequency so far as the observer is concerned corresponds to the high frequency manipulation of the intermediate frame which results in a flicker-free animation effect being seen by the observer. This high processing frequency is quite independent of the rate at which the intermediate picture itself is derived which, in any case, as has been explained above is not constant but depends on the complexity of the 3-dimensional model and the total number of voxels which are produced therefrom.

Figure 2:
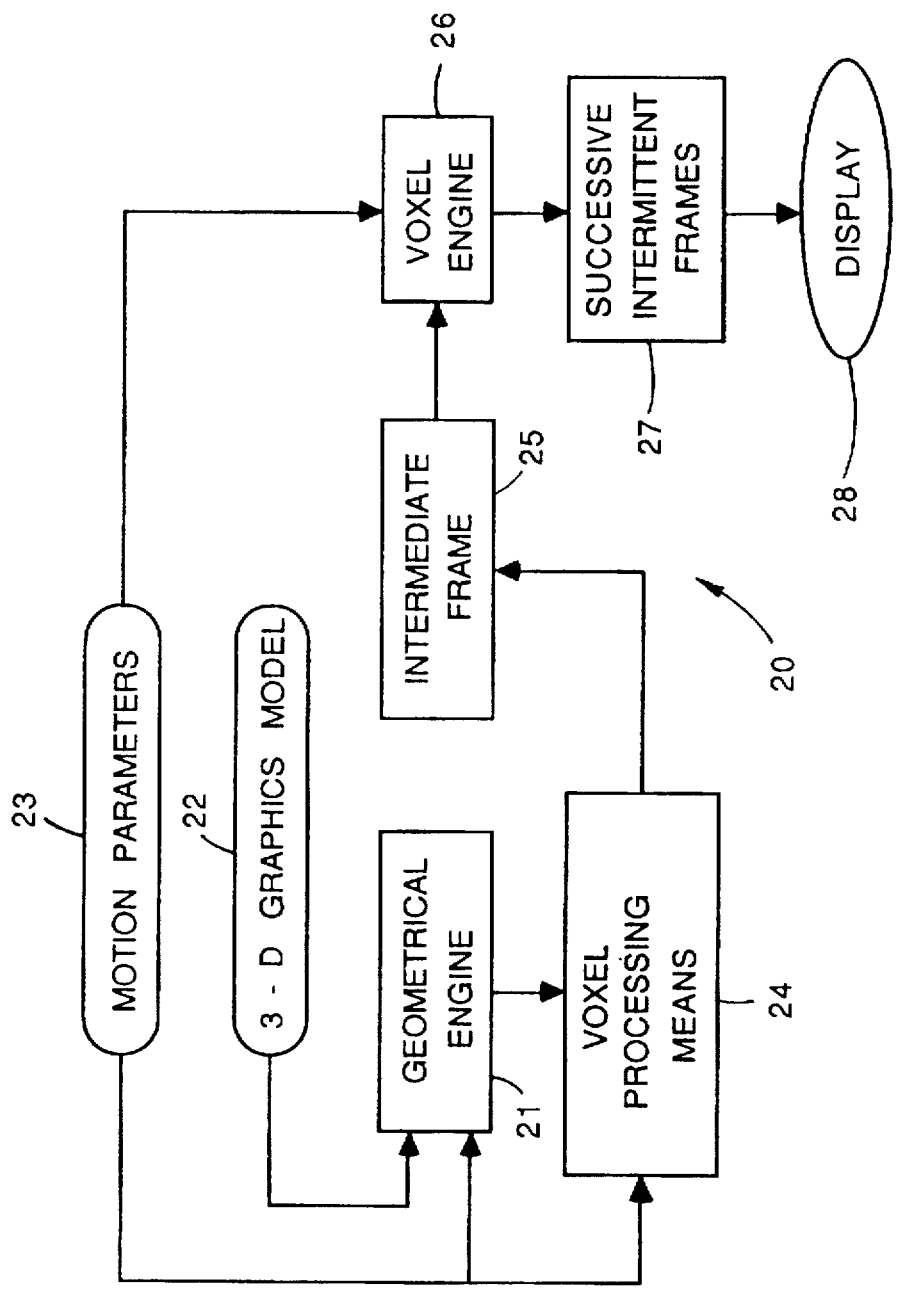
FIG. 2 is a block diagram showing a system for carrying out the method illustrated in FIG. 1.

Referring now to FIG. 2 of the drawings there is shown a system 20 comprising a geometrical engine 21 for manipulating a 3-dimensional graphics model stored in a memory 22 (constituting a storage means) and movement determination means 23 for deriving the motion parameters which describe the relative movement of the observer's line of sight with respect to the model. The geometrical engine 21 constitutes a geometrical processing means which processes the 3-dimensional geometrical graphics in accordance with the motion parameters produced by the movement determination means 23 so as to derive a large number of voxels some of which are hidden from the line of sight of the observer. A voxel processing means 24 coupled to the geometrical engine 21 and to the movement determination means 23 and responsive to the motion parameters generated thereby processes the large number of voxels in order to remove the hidden voxels and so produce an intermediate frame 25 containing only a relatively small number of voxels which are within the observer's line of sight. The intermediate frame 25 is processed by a voxel engine 26 which is also coupled to the movement determination means 23 and is responsive to the motion parameters generated thereby in order to produce successive intermittent frames 27 of pixels which are displayed on a display 28.

In such a system, the voxel engine 26 operates at a relatively high frequency (typically 30 Hz). In contrast to this, the frequency of the geometrical engine 21 depends, as has been explained above, on the complexity of the 3-dimensional model and on the total number of voxels produced therefrom by the geometrical engine 21 and thus fluctuates. In practice, this means that the rate at which a new intermediate frame 25 is presented to the voxel engine 26 also fluctuates but this is of no concern since the voxel engine 26 manipulates the same intermediate frame 25 at a constant frequency until the intermediate frame 25 is replaced by the geometrical engine 21.

The method and system according to the invention results in a more stable display being obtained since details which vanish and reappear at high frequency in the intermediate frame 25 consequent to slight movement of the observer's line of sight are effectively filtered out and do not appear in the intermittent frames 27 which are actually displayed. Such filtering is due to the fact that the 3-dimensional model is processed by the geometrical engine 21 at a frequency which is insufficiently high to register momentary flicker which is unstable.

Furthermore, since the frequency at which the successive intermittent frames 27 of pixel data are displayed is dependent only on the voxel engine 26 and not on the complexity of the 3-dimensional graphics model and on the total number of voxels produced therefrom by the geometrical engine 21, this high frequency is independent of the "worst case" data processed by the geometrical engine 21. This, of course, is in marked contrast to hitherto proposed methods and systems wherein the overall processing frequency is limited by the "worst case" data which, in practice, requires that even the "worst case" data must be processed at a sufficiently high frequency to produce a flicker-free display. This in turn, of course, requires very fast graphics processors which results in hitherto proposed systems being expensive.

In contrast to this, in the invention, the geometrical engine 21 may operate at a much reduced frequency compared to that of the voxel engine 26 since it is not the processing frequency of the geometrical engine 21 which determines the frequency at which the resulting successive intermittent frames 27 of pixel data are displayed. The system according to the invention is, therefore, significantly less expensive than hitherto proposed systems.

We claim:

1. In a process for animating a 3-dimensional graphics model composed of geometrical elements which is viewed by an observer whose line of sight effects relative movement with respect to the model, a method for animating frames of pixels, comprising the steps of:

(1) obtaining motion parameters corresponding to the relative movement of the observer's line of sight with respect to the model, (2) processing all of the geometrical elements in the 3-dimensional graphics model in order to derive a plurality of voxels of which a first portion of the plurality of voxels are hidden from the observer's line of sight, (3) eliminating the first portion of the plurality of voxels from the plurality of voxels so as to derive a second portion of voxels which are within the observer's line of sight, (4) producing an intermediate frame of voxels from the second portion of voxels, (5) writing the intermediate frame of voxels to a memory;

(6) cyclically repeating steps 1–5 at a first variable speed whereby the intermediate frame of voxels overwrites each cycle the prior intermediate frame of voxels;

(7) processing the intermediate frame of voxels presently in the memory so as to produce an intermittent frame of pixels;

(8) displaying the intermittent frame of pixels, and (9) cyclically repeating steps 7–8 independent of steps 1–5 and at a second constant speed which is greater than the first variable speed.

2. The method according to claim 1, wherein the first speed is variable and which at least partially depends on the complexity of the 3-dimensional graphics model and on the total number of voxels derived therefrom.

3. The method according to claim 1 wherein the first speed is performed at a fixed rate and wherein the second constant speed is greater than the first speed.

4. The method according to claim 1, wherein the 3-dimensional graphics model is processed using polygon modeling.

5. A system for animating a 3-dimensional graphics model composed of geometrical elements which is viewed by an observer whose line of sight effects relative movement with respect to the model, said system comprising:

storage means for storing the 3-dimensional graphics model, movement determination means for determining relative movement of the observer's line of sight with respect to the model, geometrical processing means coupled to the storage means and to the movement determination means and responsive to the relative movement of the observer's line of sight with respect to the model for processing the 3-dimensional graphics model in order to derive a plurality of voxels of which a first portion of the plurality of voxels are hidden from the observer's line of sight, voxel processing means coupled to the geometrical processing means and to the movement determination means and responsive to the relative movement of the observer's line of sight with respect to the model for eliminating the first portion of the plurality of voxels from the plurality of voxels so as to derive a second portion of voxels which are within the observer's line of sight frame processing means coupled to the voxel processing means for producing an intermediate frame of voxels from the second portion of voxels, and for storing the intermediate frame of voxels by the storage means generation cycling means coupled to the movement determination means, the geometrical processing means, the voxel processing means and the frame processing means, for cycling at a first variable speed through the generation of an intermediate frame of voxels by the movement determination means, the geometrical processing means, the voxel processing means and the frame processing means, whereby the intermediate frame of voxels generated overwrites each cycle the prior intermediate frame of voxels, pixel processing means for processing the intermediate frame of voxels presently stored by the storage means so as to produce an intermittent frame of pixels, display means coupled to the pixel processing means for displaying the intermittent frame of pixel, display cycling means coupled to the pixel processing means and the display means for cycling at a second constant speed through the display of a subset of the intermediate frames of voxels using intermittent frames of pixels and wherein the first variable speed at which the generation cycling means operates is at a rate which is lower than the second constant speed at which the display cycling means operates.

6. The system according to claim 5, wherein the first variable speed at which the generation cycling means operates is variable and depends at least in part on the complexity of the 3-dimensional graphics model and on the total number of voxels derived therefrom.

7. The system according to claim 5, wherein the first speed at which the generation processing means operates is fixed.

* * * * *